United States Patent
Klatt et al.

(10) Patent No.: US 6,647,727 B2
(45) Date of Patent: Nov. 18, 2003

(54) METHOD FOR CONTROLLING A LOW-PRESSURE BYPASS SYSTEM

(75) Inventors: Stefan Klatt, Mannheim (DE); Kurt Schnaithmann, Mannheim (DE)

(73) Assignee: Alstom (Switzerland) Ltd., Baden (CH)

( * ) Notice: Subject to any disclaimer, the term of this patent is extended or adjusted under 35 U.S.C. 154(b) by 0 days.

(21) Appl. No.: 10/207,076

(22) Filed: Jul. 30, 2002

(65) Prior Publication Data

US 2003/0024248 A1 Feb. 6, 2003

(30) Foreign Application Priority Data

Jul. 31, 2001 (CH) .......................................... 2001 1422

(51) Int. Cl.⁷ .............................. F01K 7/34; F01K 7/06
(52) U.S. Cl. .............................. 60/653; 60/662; 60/663; 60/679
(58) Field of Search ........................ 60/653, 660, 662, 60/663, 679

(56) References Cited

U.S. PATENT DOCUMENTS

| | | | |
|---|---|---|---|
| 4,042,813 A | * 8/1977 | Johnson | ....................... 703/18 |
| 4,132,076 A | 1/1979 | Weiss | |
| 4,184,337 A | 1/1980 | Bloch | |
| 4,226,086 A | * 10/1980 | Binstock et al. | ............... 60/656 |
| 4,254,627 A | 3/1981 | Gruber et al. | |
| 4,324,103 A | 4/1982 | Bloch | |
| 4,448,026 A | * 5/1984 | Binstock et al. | ............... 60/662 |
| 4,455,836 A | * 6/1984 | Binstock et al. | ............... 60/663 |
| 6,045,332 A | 4/2000 | Lee et al. | |

FOREIGN PATENT DOCUMENTS

| | | |
|---|---|---|
| DE | 2837502 A1 | 2/1980 |
| DE | 2837502 C2 | 9/1986 |

* cited by examiner

Primary Examiner—Hoang Nguyen
(74) Attorney, Agent, or Firm—Adam J. Cermak

(57) ABSTRACT

In a method for controlling a steam turbine installation having a reheater (7) arranged between high-pressure turbine (2) and medium-pressure turbine (3) or low-pressure turbine (4), a low-pressure bypass (18) with a low-pressure bypass valve (19) also being present, which bypass leads from the reheater outlet into a condenser (5), a flexible and optimum control with respect to variable high-pressure turbine exhaust steam temperature ($T_{HD}$) is achieved in that characteristic curves for the required value of the reheater pressure are used for controlling the low-pressure bypass valve (19) during run-up, during (partial) load rejection procedures or during idling, which characteristic curves depend on the load (L) applied to the installation, and/or on the pressure (P) before the high-pressure turbine blading and/or on the reheater steam flow (M), and also on the high-pressure turbine exhaust steam temperature ($T_{HD}$), and/or on the temperature ($T_{FD}$) and/or on the pressure ($p_{FD}$) of the live steam introduced into the high-pressure turbine, and/or on the reheater pressure ($P_2$).

12 Claims, 4 Drawing Sheets

METHOD FOR CONTROLLING A LOW-PRESSURE BYPASS SYSTEM

TECHNICAL FIELD

The present invention relates to a method for controlling a low-pressure bypass system for a steam turbine installation having a reheater, in particular for run-up from the cold condition, for idling and low-load operation and after load rejection procedures.

PRIOR ART

Steam turbine installations with reheaters are steam turbines in which the steam emerging from turbines of certain pressure stages is heated again in a reheater before its introduction into a turbine with lower inlet pressure and, after passing the lower pressure units, is supplied to a condenser.

In order to start the block, it has been found advantageous, for various reasons and as a function of the mode of operation, to initially load the boiler to a minimum output by means of a steam bypass system, and then to begin the turbine starting procedure. Thus, in the case of a cascading bypass or wet reheater bypass system, the live steam is guided by means of a high-pressure bypass valve with downstream water injection to the "cold" reheater rail and, after superheating in the reheater, is led from the "hot" reheater rail via a low-pressure bypass valve into the condenser. This bypass system is also employed if, after a load rejection (for example when the mains circuit-breaker is opened) or in the case of a rapid shut-down of the turbine, the steam generated cannot be completely accepted by the turbine or cannot be accepted at all. Whereas the high-pressure bypass system depends essentially on the requirements of the boiler, the design and control of the low-pressure bypass system is determined by the steam turbine. The core feature in controlling a low-pressure bypass control system is the pressure control of the hot reheater main. As a rule, the required value control for the low-pressure bypass system consists of a minimum pressure and a floating pressure characteristic curve, which are triggered by a choice of maximum.

In the past, there were various concepts for forming the floating pressure characteristic curve for the required value control for the reheater pressure:

Derivation from the output.

Derivation from the pressure before the blading of the high-pressure turbine.

Derivation from the reheater steam flow, which can be calculated or measured.

A common feature of all these concepts is the fact that a certain required value characteristic curve is formed by means of suitable measures, which required value characteristic curve is located, during turbine operation, above the "natural" floating pressure characteristic curve, which is determined by the swallowing capacity of the medium-pressure turbine, so that the low-pressure bypass station remains closed.

PRESENTATION OF THE INVENTION

The invention is therefore based on the object of making available a method for controlling a steam turbine installation having a reheater arranged between high-pressure turbine and medium-pressure turbine or low-pressure turbine, the steam turbine installation also comprising a low-pressure bypass with a low-pressure bypass valve, which low-pressure bypass leads from the reheater outlet into a condenser. The method is intended to permit the determination of the control of the reheater pressure value required for the low-pressure bypass station in such a way that, on the one hand, the low-pressure bypass station remains closed in turbine operation but, on the other hand, account is taken of the requirements arising from the starting and low-load operation of the high-pressure steam turbine so that, for example, windmilling of the high-pressure turbine is prevented or limited.

The present invention achieves this object in that characteristic curves for the required value of the reheater pressure are used for controlling the low-pressure bypass valve during run-up, during (partial) load rejection procedures or during idling, which characteristic curves depend on the load applied to the installation, and/or on the pressure before the high-pressure turbine blading and/or on the reheater steam flow, and also on the high-pressure turbine exhaust steam temperature, and/or on the temperature and/or on the pressure of the live steam introduced into the high-pressure turbine, and/or on the reheater pressure.

The core of the invention therefore consists in the provision not only of one single characteristic curve for the required reheater pressure value of the low-pressure bypass device as a function of one of the parameters known for this from the prior art, namely the load applied to the installation and/or the pressure before the high-pressure turbine blading and/or the reheater steam flow but, rather, of a characteristic curve field which, on the basis of one or a plurality of the previously mentioned parameters according to the prior art, additionally determines the required reheater pressure value as a function of the high-pressure exhaust steam temperature from the high-pressure turbine and/or of the temperature and/or of the pressure of the live steam introduced into the high-pressure turbine, and/or of the reheater pressure in the cold reheater rail.

In this arrangement, the swallowing capacity of the low-pressure bypass station is preferably designed in such a way that the associated floating pressure characteristic curve is located below the natural floating pressure characteristic curve, which is determined by the swallowing capacity of the medium-pressure turbine, when the low-pressure bypass valve is fully open.

According to a first preferred embodiment of the method, the characteristic curves are located, as a function of the load applied to the installation and/or of the pressure before the high-pressure turbine blading and/or of the reheater steam flow, between a maximum characteristic curve, determined by the required pressure value during turbine operation, and a minimum characteristic curve, determined by the minimum permissible pressure at full reheater flow, for different values of high-pressure turbine exhaust steam temperature and/or of the temperature and/or of the pressure of the live steam introduced into the high-pressure turbine and/or of the reheater pressure. The maximum characteristic curve determined by the required pressure value during turbine operation is typically located in this arrangement approximately 5 percent above the natural floating pressure characteristic curve, which is determined by the swallowing capacity of the medium-pressure turbine. In addition, the characteristic curves have, in the usual manner, a maximum value which is provided by the opening pressure of the safety valves.

According to a further preferred embodiment of the method, the characteristic curves are essentially linear with respect to the load applied to the installation, and/or with respect to the pressure before the high-pressure turbine blading, and/or with respect to the reheater steam flow. In a further preferred embodiment, the characteristic curves are also essentially linear with respect to the high-pressure turbine exhaust steam temperature, and/or with respect to the temperature and/or with respect to the pressure of the live steam introduced into the high-pressure turbine, and/or with respect to the reheater pressure. In addition, the characteristic curves preferably extend through a common origin, i.e. rotations about this common origin result for different values of high-pressure turbine exhaust steam temperature, and/or temperature and/or pressure of the live steam introduced into the high-pressure turbine, and/or reheater pressure.

According to another preferred embodiment of the method, the pressure in the cold reheater main before reheater inlet is used as a further control parameter for determining the characteristic curves.

In a particularly preferred method, the required value for the high-pressure exhaust steam temperature is determined by the live steam temperature, the high-pressure exhaust steam temperature being controlled to a value which is located around a constant value of preferably, in particular, in the region of 100 degrees Celsius below the live steam temperature. In this arrangement, the required value of the high-pressure exhaust steam temperature is always kept, however, within a range between a maximum value and a minimum value, the minimum value being typically located in the region of 320 degrees Celsius and the maximum value typically in the range from 420 to 450 degrees Celsius. Specifically, this means that in the case of live steam temperatures above 520 degrees Celsius, for example, the high-pressure exhaust steam temperature is always controlled so that it is limited to a value of 420 degrees Celsius as a maximum, and that in the case of live steam temperatures below 420 degrees Celsius, it is always controlled to a temperature limited to a value of 320 degrees Celsius as a minimum.

According to a further preferred embodiment of the above method, the control of the low-pressure bypass valve is carried out, with simultaneous trimming of the high-pressure turbine and the medium-pressure turbine or low-pressure turbine, by means of an inlet valve arranged in the live steam main before the high-pressure turbine and an intercept valve arranged before the medium-pressure turbine, the trimming condition of the high-pressure and medium-pressure/low-pressure turbine being, in particular, likewise preferably employed for determining the relevant characteristic curves. The trimming alone, such as is described in U.S. Pat. No. 4,132,076, for example, can lead to complete closing of the intercept valve under certain conditions, the result of which is that steam no longer flows through the medium-pressure turbine and low-pressure turbine, and the minimum cooling steam flow is no longer ensured for medium-pressure/low-pressure. The combination with the control by means of the low-pressure bypass valve can prevent this because, by this means, the high-pressure exhaust steam temperature can be reduced without the intercept valve having to be completely closed.

Further preferred embodiments of the method according to the invention are given in the sub-claims.

In addition, the present invention relates to an appliance for carrying out the method mentioned above. The appliance is, in particular, characterized in that a unit is arranged to calculate the required reheater value, which unit calculates, from the process values of the steam turbine installation influencing the characteristic curves, the characteristic curves corresponding to these values and controls, by means of a bypass control unit, the low-pressure bypass valve as a function of the process. In addition, a high-pressure/medium-pressure trim unit is preferably arranged for trimming the high-pressure turbine and medium-pressure turbine, which trim unit can supply the trimming condition to the unit for calculating the required reheater value.

Further preferred embodiments of the appliance according to the invention are given in the sub-claims.

BRIEF EXPLANATION OF THE FIGURES

The invention is explained in more detail below, using embodiment examples, in association with the drawings. In the drawings.

WAYS OF CARRYING OUT THE INVENTION

Figure 1:
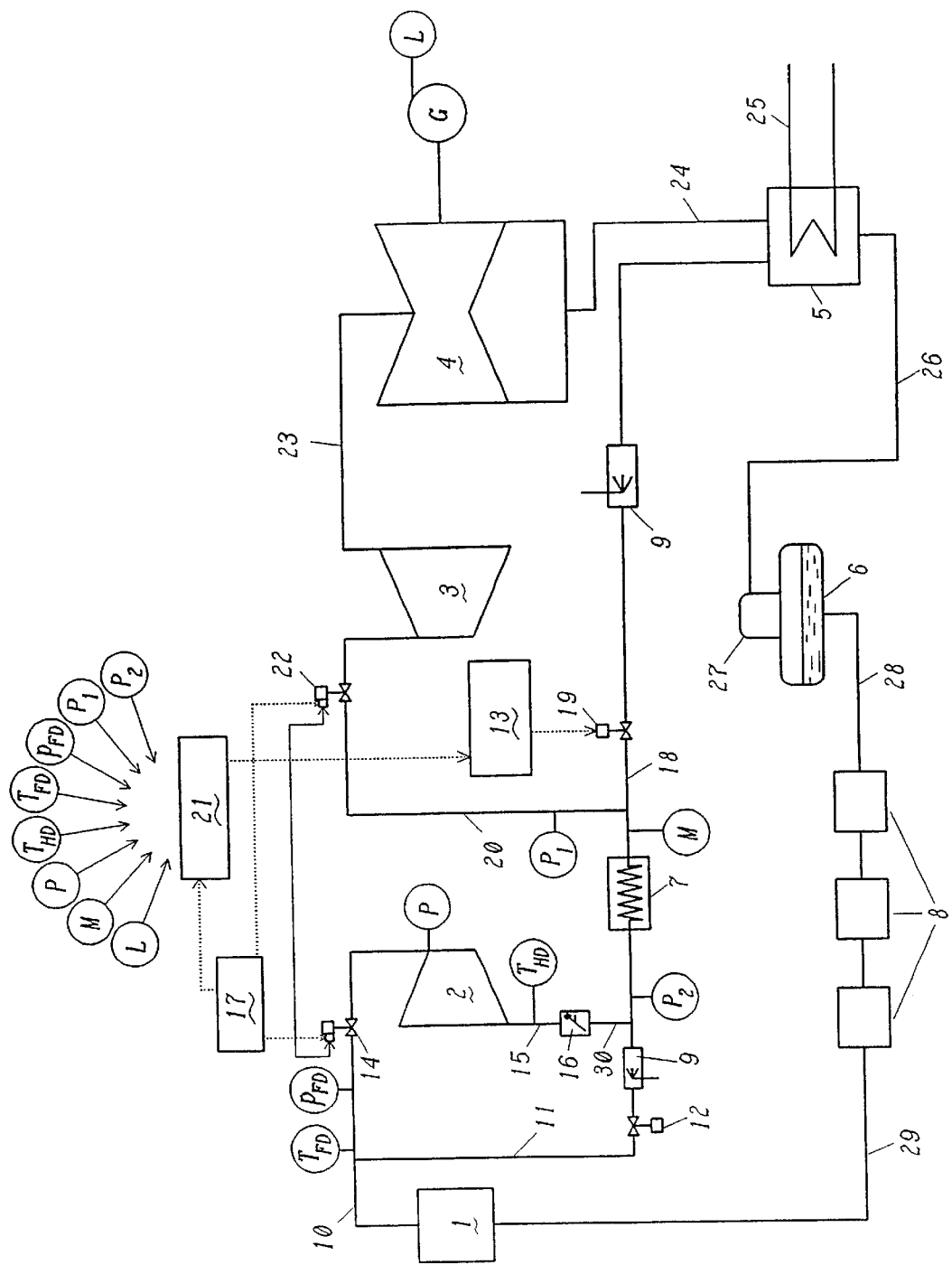
FIG. 1 shows a diagrammatic representation of a steam turbine installation with a control appliance for controlling the low-pressure bypass.

FIG. 1 shows, firstly, a conventional steam turbine installation with reheater 7 and three steam stages, a high-pressure turbine 2, a medium-pressure turbine 3 and a low-pressure turbine 4. Hot steam from the boiler 1 is admitted to the high-pressure turbine 2 via a live steam main 10. In this arrangement, the live steam main 10 has an inlet valve 14, by means of which the inlet into the high-pressure turbine 2 can be controlled. After the high-pressure turbine 2, the steam in the high-pressure exhaust steam main 15 is supplied via a non-return valve 16 and cold reheater main 30 to a reheater 7 and, subsequently via a main 20, to the hot reheater main to the inlet into the medium-pressure turbine 3, which hot reheater main can be controlled in turn by an intercept valve 22. The steam 23 emerging from the medium-pressure turbine 3 is finally supplied to the low-pressure turbine 4 and is expanded in the latter in a last step. In this arrangement, the three turbines 2, 3 and 4 drive a generator G in order to generate electricity. After the low-pressure turbine 4, the almost completely expanded steam 24 is supplied to a condenser 5, which is cooled by a cooling medium 25 (gaseous or liquid), with the result that the water 26 is present in a liquid condition behind the condenser. This water is now supplied, with or without previous preheating, to a feed-water tank 6, which may possibly have a degassing unit 27 placed on it, and is there held ready. In a closed circuit, the degassed water 28 is extracted from the feed-water tank 6, is heated in the preheating stages 8 and is introduced as steam 29, for example, into the boiler 1 for heating.

In order to control such a steam turbine installation, particularly when load is switched off or during starting, additional possible steam guides are now, furthermore, provided. Thus, for example, a high-pressure bypass 11 is arranged which controllably connects, via a high-pressure bypass valve 12, the live steam main 10 (from before the inlet valve 14) to the cold reheater main 30 between the high-pressure turbine 2 and reheater 7 and after the non-return valve 16. This high-pressure bypass 11 with additional water injection 9 after the high-pressure bypass valve 12 permits the high-pressure turbine 2 to be bypassed. In addition, a low-pressure bypass 18, which can be controlled by means of a low-pressure bypass valve 19, is arranged after the reheater 7 between the main and the condenser 5. The low-pressure bypass 18 permits the medium-pressure turbine 3 and the low-pressure turbine 4 to be bypassed, which can be necessary, particularly in the case of run-up of the installation from the cold condition, during idling or in the case of (partial) load rejection. In order to prevent severe overheating of parts of the installation, the possibility of an injection 9 of water into the main 18 is also provided in the low-pressure bypass 18 before introduction into the condenser 5. Low-pressure and high-pressure bypasses together form the cascading bypass system mentioned at the beginning.

In order to control a start from the cold condition and to combat excessive heating of the high-pressure turbine 2, a starting or relief main can also be provided which, branching off between non-return valve 16 and high-pressure turbine 2, connects the high-pressure turbine 2 to the condenser 5. A valve and a water injection device is then normally provided in this relief main also. This arrangement of an additional relief main with water injection is known, for example, from DE 2837502 C2 and is described in the latter as being advantageous for load switch-off and starting.

In this connection, the high-pressure/medium-pressure trim unit 17, the unit for calculating the required reheater value 21 and the bypass control unit 13 are important for controlling such a steam turbine installation. Because the high-pressure exhaust steam temperature $T_{HD}$ has, in certain operating conditions (run-up, part-load operation, load rejection), the tendency to exceed critical values and to give rise to material damage, particular attention must be paid to this process parameter. The high-pressure exhaust steam temperature $T_{HD}$ depends on diverse parameters. Thus, the value of $T_{HD}$ is influenced by the mass flow through the high-pressure turbine 2, by the back pressure, by the live steam temperature $T_{FD}$ and by the live steam pressure $p_{FD}$ (as $p_{FD}$ is increased, $T_{HD}$ is also increased).

The high-pressure/medium-pressure trim unit 17 is used to trim the high-pressure turbine 2 and the medium-pressure turbine 3 and/or the low-pressure turbine 4 relative to one another during starting or in (part) load operation. In this connection, trimming is understood to mean that the inlet valve 14 is opened further in the case of excessive temperature $T_{HD}$ at the high-pressure turbine outlet while, at the same time, the intercept valve 22 is closed. This relative trimming leads to a specific reduction in the temperature $T_{HD}$ at the high-pressure turbine outlet. This trimming is, for example, comprehensively described in U.S. Pat. No. 4,132,076.

As already mentioned above, the control of the reheater pressure $P_1$ takes place, according to the prior art, in such a way that a characteristic curve is specified either as a function of the pressure P at the initial high-pressure turbine blading, or as a function of the load applied to the steam turbine installation, or as a function of the mass flow flowing through the reheater 7, and/or of the reheater steam flow M, and is adjusted by means of the low-pressure bypass valve 19.

Figure 2:
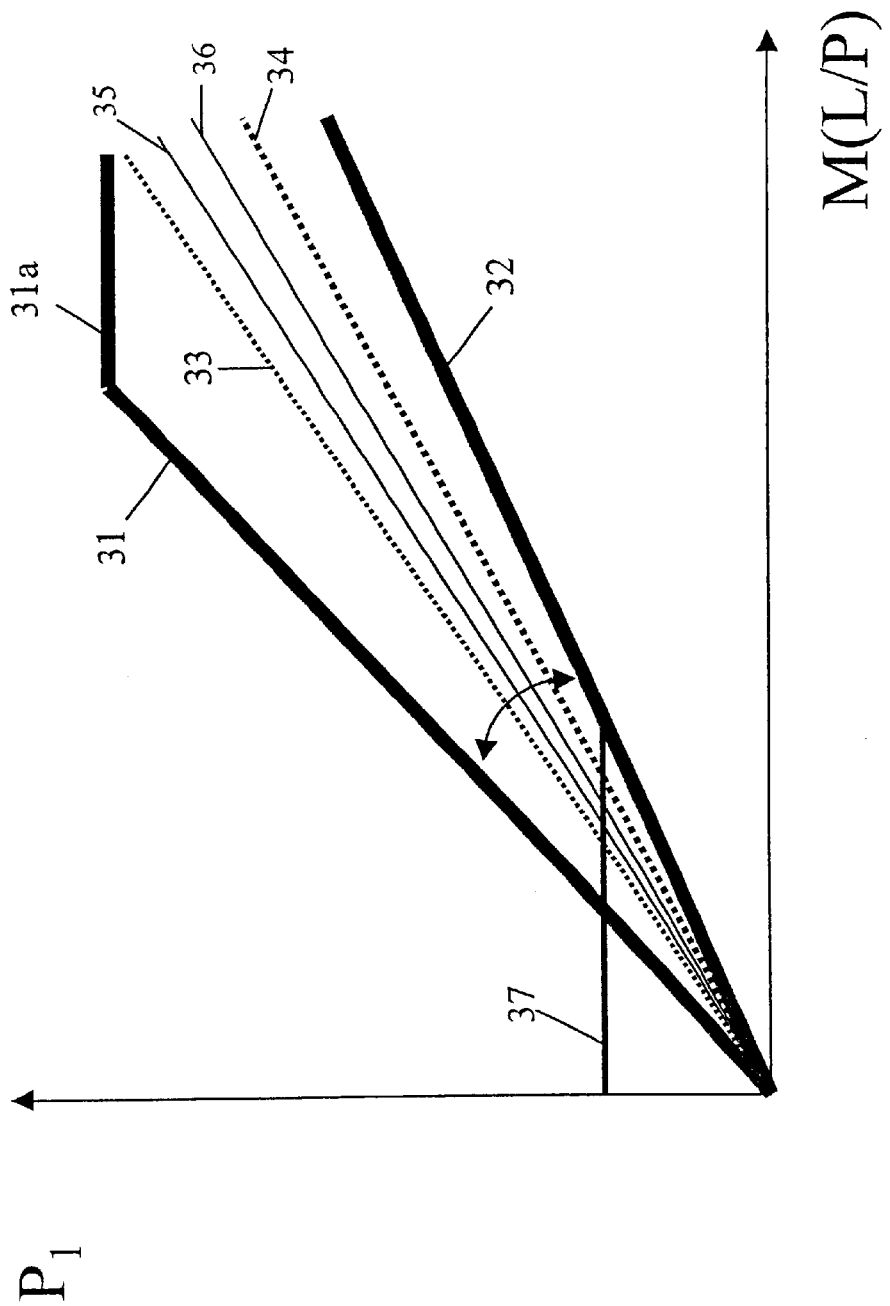
FIG. 2 shows a representation of the required reheater pressure value as a function of the reheater flow for various modes of operation, taking account, in particular, of the control range.

FIG. 2 shows, for example, such a characteristic curve 31 for the required pressure value $P_{soll}$ during turbine operation as a function of the mass flow M.

Similar characteristic curves apply as a function of the load L applied to the steam turbine installation or as a function of the pressure P at the initial high-pressure turbine blading. The characteristic curve 31 is essentially linear with respect to the mass flow and extends through the origin. It should be noted that during run-up, the characteristic curve 31, as a maximum value from the minimum pressure 37, is composed of the inclined flank of the characteristic curve 31, together with a maximum value 31a, which is provided by the maximum pressure of the safety valves in the reheater 7. Specifically, this means that during run-up, the boiler 1 is initially run up with bypasses open (high-pressure bypass valve 12 and low-pressure bypass valve 19 fully open) and with inlet valve 14 and intercept valve 22 closed at the same time to the point where the required minimum pressure 37 appears. During this run-up, the turbines are already rotating but do not have steam flowing through them. If the required minimum pressure 37 has appeared, the turbines 2, 3 and 4 are put into operation with staggered or simultaneous partial opening of the valves 14 and 22, initiated by other required critical process values having been attained. The valves 22 and 19 are then opened or closed, synchronously and working in opposite directions.

Fundamentally, there are various typical characteristic curves in the diagram of FIG. 2. On the one hand, there is the natural floating pressure characteristic curve 33 during turbine operation, which reflects the uncontrolled condition, i.e. the variation of the reheater pressure $P_1$ as a function of the mass flow M through the reheater 7 at variable boiler output. On the other hand, there is a characteristic curve 32 of minimum permissible pressure at full reheater flow. The characteristic curve 32 is determined by the maximum permissible pressure drop across the high-pressure turbine 2 and by the maximum flow velocity in the reheater 7 or steam consumption units connected elsewhere to the reheater 7. In addition, there is a floating pressure characteristic curve 34 during bypass operation. This is advantageously located between the natural floating pressure characteristic curve 33 during turbine operation and the characteristic curve 32 for the minimum permissible pressure at full reheater flow. The floating pressure characteristic curve 34 reflects the variation of the pressure $P_1$ as a function of the mass flow M through the reheater 7 when the valves 12 and 19 are fully open. The swallowing capacity of the bypass system should be greater than that of the turbines and, in consequence, the floating pressure characteristic curve 34 should lie below the natural floating pressure characteristic curve 33.

The required value for the control of the valve 19 is typically adjusted to accord with the characteristic curve 31, i.e. somewhat above the natural floating pressure characteristic curve 33. The inclined region of the characteristic curve 31 is typically located approximately 5 percent above the natural floating pressure characteristic curve 33.

According to the invention, however, the system does not just operate by using a single characteristic curve 31, which depends in turn only on the mass flow M, the output L or the pressure P, but, rather, a group of characteristic curves is employed, this group of curves being arranged between the limiting characteristic curves 31 and 32. The choice of which of the characteristic curves to use for control purposes takes place as a function of further parameters, in particular as a function of the high-pressure exhaust steam temperature $T_{HD}$ and/or of the live steam temperature $T_{FD}$ and/or of the live steam pressure $p_{FD}$ and/or of the pressure $P_2$ in the cold reheater main 30. The characteristic curves then extend essentially linearly and through a common origin, i.e. the additional parameters rotate the characteristic curves, to a certain extent, about this origin.

In this connection, control systems with and without I-constituent can be considered for the determination of characteristic curves.

As an example, FIG. 2 also shows two representative curves from a possible group of characteristic curves. The required value line 35 stands for required values for large $T_{HD}$ in the case of a P control system and the required value line 36 stands for the corresponding required value for lower $T_{HD}$.

As an example for a possible dependence of a group of characteristic curves on the live steam temperature $T_{FD}$, it is possible to quote a control system in which, by means of the low-pressure bypass valve 19, the high-pressure exhaust steam temperature $T_{HD}$ is controlled to a value which lies at a constant value below the temperature of the live steam $T_{FD}$. In this connection, for example, it is a typical procedure to control the value of $T_{HD}$ to a value which is 100 degrees Celsius less than $T_{FD}$ but with $T_{HD}$ being located, at any rate, within a range between 320 degrees Celsius and 420 or 450 degrees Celsius. In other words, $T_{HD}$ is controlled to a $T_{HD}$ of 420 or 450 degrees Celsius for all values of $T_{FD}$ above 520 or 550 degrees Celsius, respectively, and is controlled to a $T_{HD}$ of 320 degrees Celsius for all values of $T_{FD}$ below 420 degrees Celsius whereas, in the intermediate range, $T_{HD}$ is set to $T_{HD}=T_{FD}$ −100 degrees Celsius:

$T_{HD}$=420 or 450° C. for $T_{FD}$>520 or 550° C., respectively
$T_{HD}=T_{FD}$ −100° C. for 420≦$T_{FD}$≦520 or 550° C.
$T_{HD}$=320° C. for $T_{FD}$<420° C.

As already mentioned above, it is found advantageous to additionally design the control system as a function of the trimming. For this purpose, the high-pressure/medium-pressure trim unit 17 is connected to the unit 21 for calculating the required reheater value in such a way that the trimming condition of the valves 14 and 22 can be employed as a further parameter for determining the characteristic curves. This is, for example, found to be particularly advantageous when, because of the trimming, the control of the high-pressure exhaust steam temperature $T_{HD}$ enters a region in which the intercept valve 22 is almost completely closed. The result of the closing of the intercept valve 22 is that the turbines 3 and 4 no longer have steam flowing through them and, in consequence, a minimum cooling steam flow is also no longer ensured. This condition can be improved by a corresponding required value determination for the low-pressure bypass valve 19.

For anticipating control of the low-pressure bypass valve 19, it is preferable to use the live steam pressure $p_{FD}$ for determining the relevant characteristic curves. The use of the pressure $P_2$ in the cold reheater main is found to be particularly advantageous in the case of combined installations in which the pressure drop over the reheater 7 can assume larger values.

Finally, it can be stated that the automatic correction, described above, of the required reheater pressure value for the purpose of optimum turbine operation is achieved even when boiler requirements are taken into account. It is possible to take account of both the effects of variable high-pressure inlet enthalpy and of reheater pressure and the requirement for minimum cooling steam flow for the medium-pressure/low-pressure system. In association with the trimming, in particular, it represents a significant contribution to optimizing the starting procedure. The concept is flexible in the case of variable high-pressure outlet temperatures $T_{HD}$ and it permits the reheater pressure to be kept high as long as possible.

Figure 3:
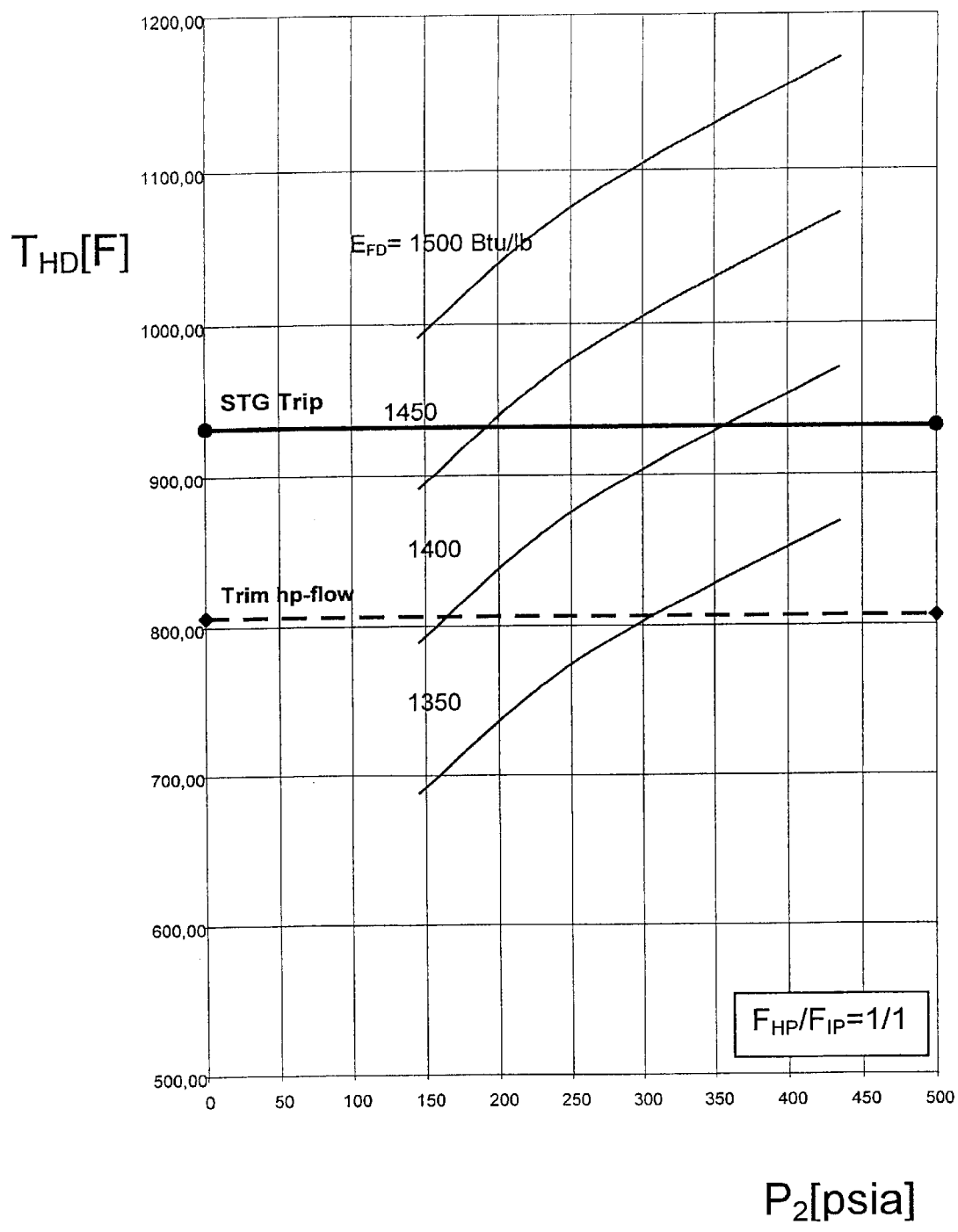
FIG. 3 shows a representation of the dependence of the high-pressure turbine exhaust steam temperature $T_{HD}$ on the reheater pressure $P_2$ and on the high-pressure inlet enthalpy $E_{FD}$, at a trim ratio $F_{HP}/F_{IP}$ of 1/1.
Figure 4:
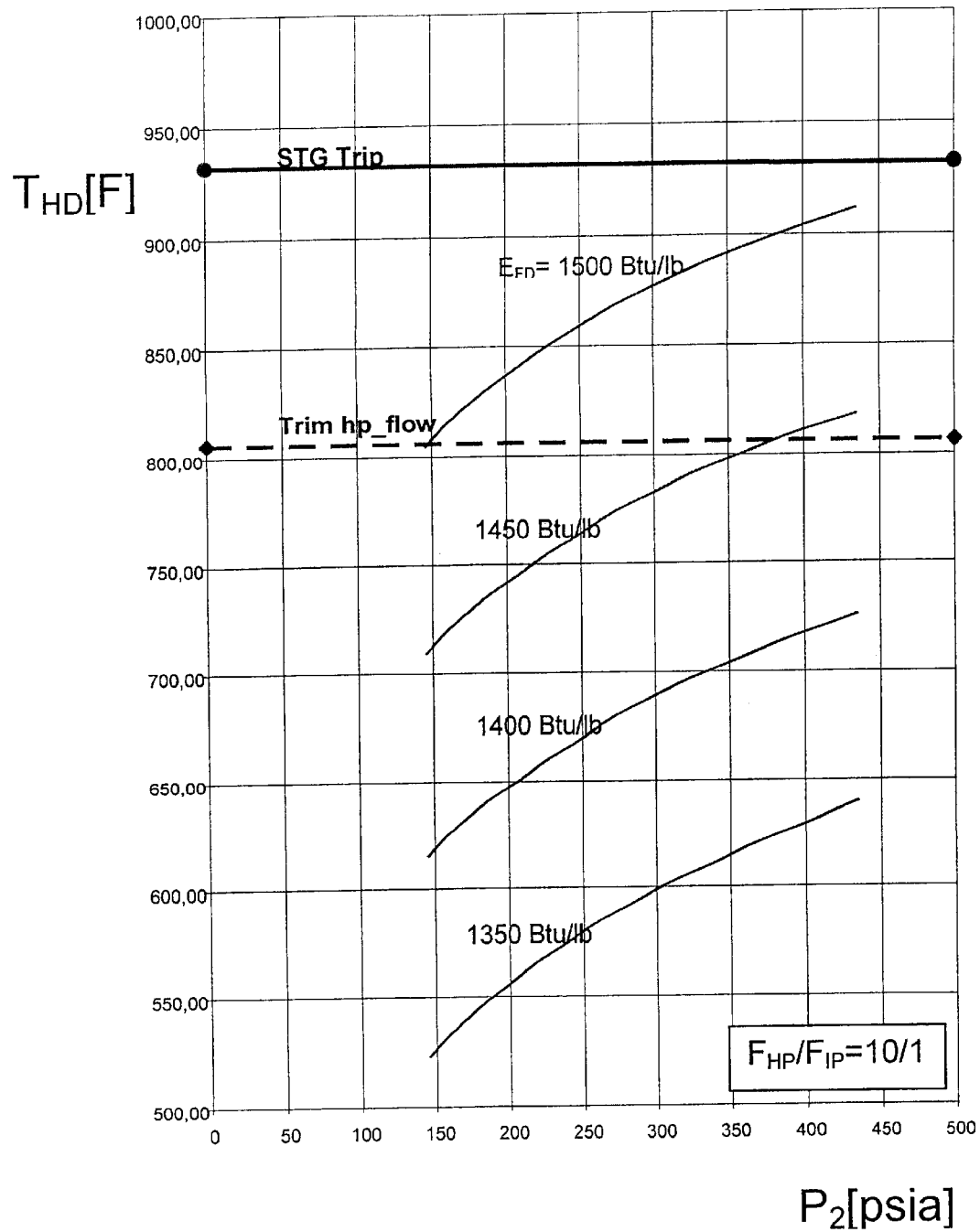
FIG. 4 shows a representation analogous to that of FIG. 3, but with a trim ratio $F_{HP}/F_{IP}$ of 10/1.

FIGS. 3 and 4 are used to illustrate the dependence of the high-pressure turbine exhaust steam temperature $T_{HD}$ on the reheater pressure $P_2$ of the cold reheater rail and on the high-pressure inlet enthalpy $E_{FD}$. In these figures, the pressure plotted on the x-axis is in "absolute pounds per square inch" (psia) (1 psia=14.5 bar), the temperature on the y-axis is in Fahrenheit (F) and the enthalpy is in BTU/lb (1 BTU/lb=2326 J/kg). FIG. 3 shows the relationships to which the system is typically adjusted during cold or warm run-up, i.e. at a trim ratio $F_{HP}/F_{IP}$ (ratio of mass flow through high-pressure turbine to mass flow through medium-pressure and/or low-pressure turbine) of 1/1. FIG. 4, on the other hand, shows the relationships to which the system is typically adjusted during hot run-up, i.e. at a trim ratio $F_{HP}/F_{IP}$ of 10/1 (i.e. for a mass flow through the high-pressure turbine which is ten times larger).

Comparison of the two figures shows the way in which, for increasing trim ratio, the high-pressure turbine exhaust steam temperature $T_{HD}$ decreases at constant high-pressure inlet enthalpy $E_{FD}$. In addition, the relationship between inlet enthalpy $E_{FD}$ and high-pressure turbine exhaust steam temperature $T_{HD}$ can be recognized at constant reheater pressure $P_2$. Likewise recognizable is the fact that in order to keep the high-pressure exhaust steam temperature $T_{HD}$ constant with increasing high-pressure inlet enthalpy $E_{FD}$, the pressure $P_2$ in the cold reheater main 30 must be reduced.

The horizontal line designated by STG Trip (Steam Turbine Generator Trip) shows the maximum value of the high-pressure turbine exhaust steam temperature (500 degrees Celsius or 932 F), i.e. when this temperature in the high-pressure exhaust steam main 15 is exceeded, the turbine is typically shut down by means of a protective switching arrangement, the high-pressure turbine and the medium-pressure and/or low-pressure turbine being bypassed by means of the bypass mains 11 and 18. This is done to prevent the high value of $T_{HD}$ leading to damage in the installation.

The interrupted horizontal line designated by Trim hp_flow at a temperature of 430 degrees Celsius (corresponding to 806 F) or a corresponding line at a somewhat different temperature can now be employed to control the trim ratio. For increasing inlet enthalpy $E_{FD}$, this means that the trim ratio is successively increased when this value of $T_{HD}$ is reached so that $T_{HD}$ is held at this maximum value.

If, in the case of such an adjustment of the trim ratio, undesirable conditions occur such as, for example, too little steam in the low-pressure region, too little power from the high-pressure turbine or an unexpected increase in the exhaust steam temperature $T_{HD}$, this line can also be used to control the low-pressure bypass 18. The same line (Trim hp_flow) therefore indicates a possible basis on which the high-pressure turbine exhaust steam temperature $T_{HD}$ can be adjusted by means of corresponding adjustment of the low-pressure bypass valve 19 in the low-pressure bypass 18. If for example, as an approximation, it is assumed that the pressure $P_1$ in the hot reheater main 20 is proportional to the pressure $P_2$ in the cold reheater main 30, it is found that in the case of increasing inlet enthalpy $E_{FD}$, the pressure $P_2$, and therefore $P_1$, must be reduced in order to keep the value of $T_{HD}$ constant, for example to the value, given here, of 430 degrees Celsius.

List of designations

1 Boiler
2 High-pressure turbine
3 Medium-pressure turbine
4 Low-pressure turbine 5 Condenser
6 Feed-water tank
7 Reheater
8 Preheating stages
9 Water injection
10 Live steam main
11 High-pressure bypass
12 High-pressure bypass valve
13 Bypass control unit
14 Inlet valve
15 High-pressure exhaust steam main
16 Non-return valve
17 HP/MP trim unit
18 Low-pressure bypass
19 Low-pressure bypass valve
20 Hot reheater main
21 Unit for calculating the required reheater value
22 Intercept valve
23 Steam after 3
24 Steam after 4
25 Cooling medium
26 Condensed water
27 Degassing unit
28 Degassed water
29 Steam introduced into the boiler
30 Cold reheater main
31 Characteristic curve for required pressure valve during turbine operation
32 Characteristic curve for the minimum permissible pressure at full reheater flow
33 Natural floating pressure characteristic curve during turbine operation
34 Floating pressure characteristic curve during bypass operation
35 Required value line for high $T_{HD}$ when using p control system
36 Required value line for low $T_{HD}$ when using p control system
37 Minimum pressure
L Load applied to the steam turbine
M Reheater steam flow, mass flow through reheater
$T_{FD}$ Live steam temperature before the high-pressure turbine
$p_{FD}$ Live steam pressure before the high-pressure turbine
$T_{HD}$ High-pressure exhaust steam temperature
P Pressure before the high-pressure turbine blading
$P_1$ Pressure in the hot reheater main
$P_2$ Pressure in the cold reheater main
$P_{soll}$ Required pressure value
$E_{FD}$ High-pressure inlet enthalpy
$F_{HP}$ Mass flow through the high-pressure turbine
$F_{IP}$ Mass flow through the medium-pressure and/or low-pressure turbine

What is claimed is:

1. A method for controlling a steam turbine installation having a reheater with an outlet, the reheater arranged between a high-pressure turbine and a medium-pressure turbine or a low-pressure turbine, and a low-pressure bypass with a low-pressure bypass valve, which low-pressure bypass leads from the reheater outlet into a condenser, the method comprising:
controlling the low-pressure bypass valve based upon characteristic curves for the required value of the reheater pressure, the controlling being performed during an event selected from the group consisting of run-up, load rejection procedures, and idling;
wherein the characteristic curves depend on a parameter selected from the group consisting of the load (L) applied to the installation, the pressure (P) before the high-pressure turbine blading, the reheater steam flow (M), the high-pressure turbine exhaust steam temperature ($T_{HD}$) the temperature ($T_{FD}$) of the live steam introduced into the high-pressure turbine, the pressure ($p_{FD}$) of the live steam introduced into the high-pressure turbine, the reheater pressure ($P_2$), and combinations thereof.

2. The method as claimed in claim 1, wherein the characteristic curves are located, as a function of a parameter selected from the group consisting of the load (L) applied to the installation, the pressure (P) before the high-pressure turbine blading, the reheater steam flow (M), and combinations thereof, between a maximum characteristic curve determined by the required pressure value during turbine operation, and a minimum characteristic curve determined by the minimum permissible pressure at full reheater flow, for different values of parameters selected from the group consisting of high-pressure turbine exhaust steam temperature ($T_{HD}$), the temperature ($T_{FD}$) of the live steam introduced to the high-pressure turbine, the pressure ($p_{FD}$) of the live steam introduced to the high-pressure turbine, the reheater pressure ($P_2$), and combinations thereof.

3. The method as claimed in claim 1, wherein the characteristic curves are essentially linear with respect to a parameter selected from the group consisting of the load (L) applied to the installation, the pressure (P) before the high-pressure turbine blading, the reheater steam flow (M), and combinations thereof.

4. The method as claimed in claim 1, wherein the characteristic curves are essentially linear with respect to a parameter selected from the group consisting of the high-pressure turbine exhaust steam temperature ($T_{HD}$), the temperature ($T_{FD}$) of the live steam introduced into the high-pressure turbine, the pressure ($p_{FD}$) of the live steam introduced into the high-pressure turbine, the reheater pressure ($P_2$), and combinations thereof.

5. The method as claimed in claim 1, wherein controlling comprises controlling based on a lower characteristic curve for the required reheater pressure value for an event selected from the group consisting of increasing high-pressure turbine exhaust steam temperature ($T_{HD}$), increasing inlet enthalpy (H) of the live steam introduced into the high-pressure turbine, increasing reheater pressure ($P_2$), and combinations thereof.

6. The method as claimed in claim 1, wherein the installation includes a reheater inlet and a cold reheater main, the cold reheater main leading to the reheater inlet, and wherein controlling comprising controlling using the pressure ($P_1$) in the cold reheater main before the reheater inlet as a control parameter for determining the characteristic curves.

7. The method as claimed in claim 1, wherein the characteristic curves depend on the reheater steam flow (M), on the high-pressure turbine exhaust steam temperature ($T_{HD}$), and on the live steam temperature ($T_{FD}$), and wherein the characteristic curves are linear with respect to the reheater steam flow (M) and extend through a common intersection.

8. The method as claimed in claim 7, wherein the required value for the high-pressure exhaust steam temperature ($T_{HD}$) is determined by the live steam temperature ($T_{FD}$), the high-pressure exhaust steam temperature ($T_{HD}$) being controlled to a value which is located around a constant value of about 100 degrees Celsius below the live steam temperature ($T_{FD}$), the required value of the high-pressure exhaust steam temperature ($T_{HD}$) being kept within a range between a maximum value of about 320 degrees Celsius and a minimum value in the range from 420 to 450 degrees Celsius.

9. The method as claimed in claim 8, wherein the characteristic curves are continually rotated by means of an I-controller which can intervene multiplicatively or with a minimum choice, and comprising decreasing the high-pressure exhaust steam temperature ($T_{HD}$) by reducing the required value for the high-pressure exhaust steam temperature ($T_{HD}$).

10. The method as claimed in claim 1, wherein the installation includes an inlet valve arranged in the live steam main before the high-pressure turbine and an intercept valve arranged before the medium-pressure turbine, and wherein controlling comprises controlling the low-pressure bypass valve with the inlet valve and with the intercept valve, and wherein controlling comprises simultaneous trimming of the high-pressure turbine and the medium-pressure turbine or low-pressure turbine, and wherein the trimming conditions of the high-pressure turbine and of the medium-pressure turbine are employed for determining the characteristic curves.

11. An appliance useful for carrying out a method as claimed in claim 1, comprising:
    a bypass control unit; and
    a unit arranged to calculate the required reheater value, which unit calculates, from the process values of the steam turbine installation (L, P, M, $T_{FD}$, $p_{FD}$, $T_{HD}$, $P_1$, $P_2$) influencing the characteristic curves, the characteristic curves corresponding to the process values; and
    wherein the unit controls the low-pressure bypass valve as a function of the process via the bypass control unit.

12. The appliance as claimed in claim 11, further comprising:
    a high-pressure/medium-pressure trim unit arranged for trimming the high-pressure turbine and medium-pressure turbine, which trim unit can supply the trimming condition to the unit for calculating the required reheater value.

* * * * *